United States Patent [19]

Ogden

[11] Patent Number: 5,925,218
[45] Date of Patent: Jul. 20, 1999

[54] REHYDRATION OF ONCE-DRIED FIBER

[75] Inventor: Roger Wayne Ogden, Covington, Va.

[73] Assignee: Westvaco Corporation, New York, N.Y.

[21] Appl. No.: 08/808,905

[22] Filed: Mar. 3, 1997

[51] Int. Cl.[6] .................................................. D21C 1/02
[52] U.S. Cl. .............................. 162/191; 162/52; 162/68; 162/4; 162/100
[58] Field of Search ................................ 162/4, 24, 52, 162/68, 191, 63, 9, 187, 100

[56] References Cited

U.S. PATENT DOCUMENTS

| | | |
|---|---|---|
| 1,704,533 | 3/1929 | De Cew . |
| 1,949,534 | 3/1934 | Doyle . |
| 1,993,148 | 3/1935 | De Cew ........................................ 92/20 |
| 2,394,273 | 2/1946 | Thomas ....................................... 92/1.5 |
| 2,454,534 | 11/1948 | Walter . |
| 3,839,144 | 10/1974 | Louden . |
| 4,087,317 | 5/1978 | Roberts . |
| 4,416,727 | 11/1983 | Elton et al. .................................. 162/6 |
| 4,421,583 | 12/1983 | Aldred . |
| 4,431,479 | 2/1984 | Barbe et al. . |
| 4,431,481 | 2/1984 | Drach et al. . |
| 4,481,077 | 11/1984 | Herrick . |
| 5,096,539 | 3/1992 | Allan . |
| 5,158,646 | 10/1992 | Nakajima . |
| 5,223,090 | 6/1993 | Klungness et al. . |
| 5,384,011 | 1/1995 | Hazard, Jr. . |
| 5,384,012 | 1/1995 | Hazard, Jr. . |
| 5,587,048 | 12/1996 | Streisel et al. .............................. 162/7 |

OTHER PUBLICATIONS

Smook, G.A., Handbook for Pulp & Paper Technologists. 2nd ed., (Vancouver: Angus Wilde Publications, 1992), p. 126.

*Primary Examiner*—Peter Chin
*Assistant Examiner*—Steven Leavitt
*Attorney, Agent, or Firm*—J. R. McDaniel; R. L. Schmalz

[57] ABSTRACT

This invention relates to the rehydration of once-dried fiber for use in a papermaking furnish. Such a rehydration of this type, generally, employs temperature, pressure and refining to make the once-dried fiber behave more like a virgin fiber. Thus, higher levels of once-dried fiber can be used without sacrificing paper formation, surface smoothness, and productivity (drainage).

7 Claims, 1 Drawing Sheet

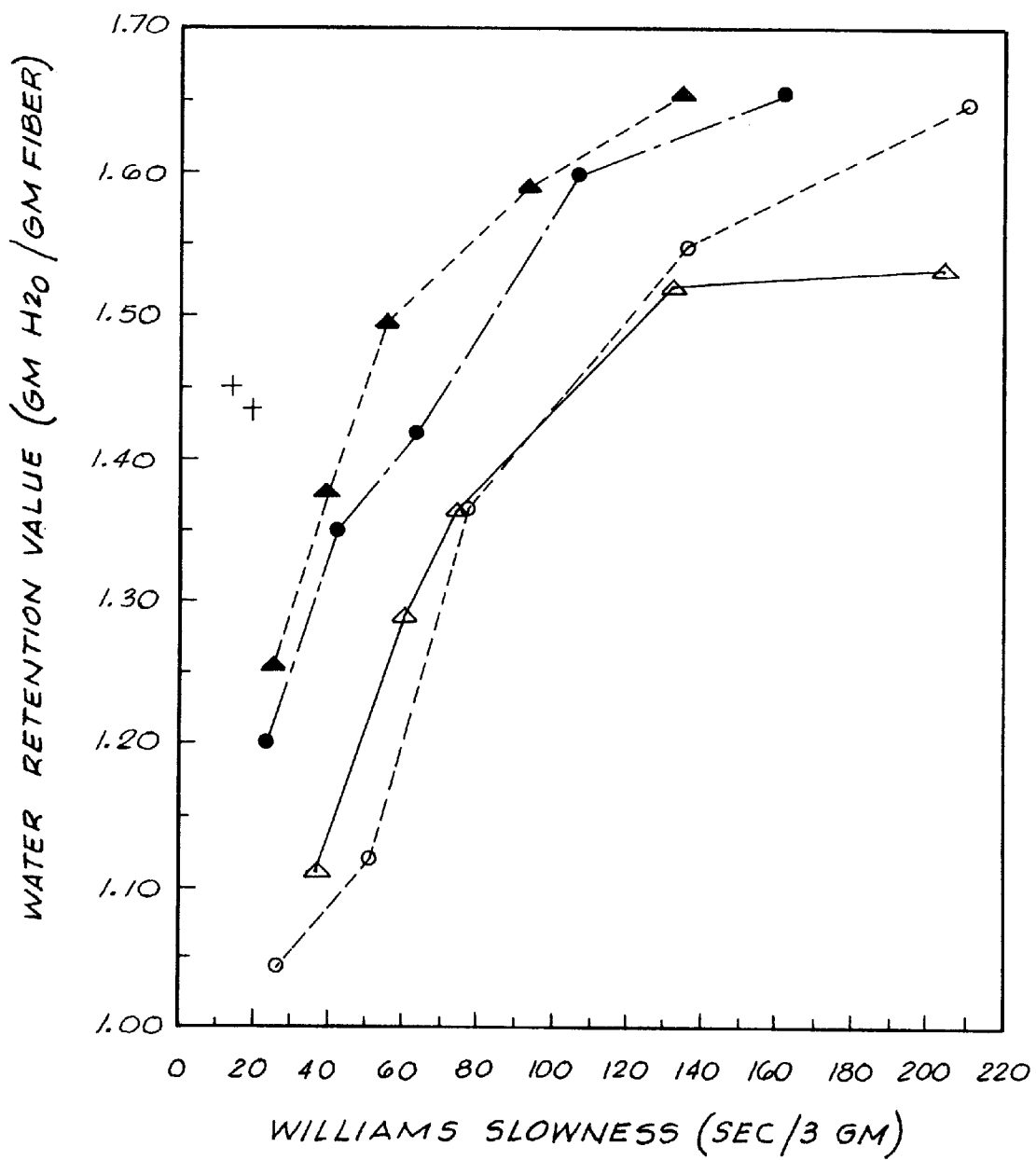

REHYDRATION OF ONCE-DRIED FIBER

BACKGROUND OF THE INVENTION

1. Field of the Invention

This invention relates to the rehydration of once-dried fiber for use in a papermaking furnish. Such a rehydration of this types generally, employs temperature, pressure and refining to make the once-dried fiber behave more like a virgin fiber. Thus, higher levels of once-dried fiber can be used without sacrificing paper formation, surface smoothness, and productivity (drainage).

2. Description of the Related Art

It is known that once-dried fiber is stiffer or more rigid than never-dried fiber and can result in hard flocs when used as a significant fraction of the papermaking furnish. These hard flocs deteriorate the formation or uniformity of the resulting paper board and increase the surface roughness of the paperboard.

Once-dried fiber is "hornified" in drying. This hornification closes the lumen pores and reduces the ability of the fiber to rehydrate or pick up water. It is recognized that lumen water increases the flexibility and plasticity of the fiber thereby making it more conformable to adjacent fibers and improves fiber-to-fiber bonding.

High temperature drying of fibers removes the water, both intersticial and lumen, collapses the lumen, and closes lumen pores. Conventional mechanical and chemical fiber treatments have limited success in restoring or rehydrating the lumen and other related fiber properties.

Conventional fiber treatment for once-dried fiber has, typically, been mechanical, such as, deflaking and refining. Deflaking improves once-dried fiber dispersion, but has little impact on rehydration. Refining (conventional and high-consistency) improves rehydration by mechanically working or flexing the fiber and fiber surface. Rehydration by refining is improved, but drainage of the fiber slurry is reduced. Also, strength properties are improved via refining and dispersion is also improved. Increased soak time for once-dried fibers improves ease of dispersion, but has little effect on rehydration.

It is also well known that lumen water content is measured by a technique called "water retention value" or WRV. Typically, this technique subjects a fiber mat to a lengthy (20 minutes), high G-Force centrifuge to remove intersticial water. The lumen water not removed by this technique of centrifuging is an excellent measure of lumen water content and the lumen rehydration of once-dried fiber.

Once-drying reduces WRV by 60–75% of never-dried fiber levels. Unbleached WRV levels are higher than WRV levels of bleached fibers. Also, softwood WRV levels are higher than hardwood WRV levels. This is because the lumen volume of a softwood is larger than the lumen volume of the hardwood.

The deflaking and conventional low consistency (2–5%) refining of once-dried fibers improves or reduces the WRV loss by 10–15% in the same slowness range. Sustained refining (3–6 times conventional virgin fiber slowness) is required to reach virgin fiber WRV levels. Once-dried fiber is also more difficult to refine, thereby, requiring 50–100% of virgin fiber requirements.

Exemplary of such prior art deflaking and refining is U.S. Pat. No. 1,704,533 ('533) to J. A. DeCew, entitled "Hydration by Pump Pressure", and U.S. Pat. No. 1,949,534 ('534) to W. T. Doyle, entitled "Method of and Apparatus for Hydrating Cellulose Pulp". In the '533 patent, there is a discussion of hydration by pump pressure to hydrate fibers by rubbing them against themselves and by mechanical refining. However, the inventor of the present invention has learned that while mechanical refining, particularly gentle fibrillation refining, does result in limited hydration, this is likely the result of rubbing or flexing of the fiber thereby, increasing fiber surface area. Similar limited hydration occurs with refining in virgin (never-dried) fibers. However, once-dried fiber hydration is limited and results in increased drainage resistance during washing/papermaking. Hydration, by even the most gentle refining to virgin fiber WRV levels, results in increased drainage resistance (freeness loss or slowness increase) to such an extent that the resulting fiber may not be desirable because of reduced productivity. Consequently, the hydration improvements of the '533 patent are not from lumen hydration, but the result of increased fibrillation and fine fraction generation.

The '534 patent to Doyle discusses hydration or beating (refining) of fiber in a rotary hammer mill. The process of the Doyle patent does not appear to hydrate the fiber but to "wet" and disperse once-dried fiber sources and fiber flakes/bundles for reuse in papermaking. The dispersion process is comparable to the repulping and deflaking of fiber webs currently employed in the industry in that its intent is to disperse these materials into individual fibers. Deflaking is aided by increased temperature and pH and by chemical addition when the original web contained materials like size or strength additives that inhibit wetting. The processes wet and disperse, not hydrate, fibers. These processes especially do not work on the lumen area of individual fibers. Therefore, a more advantageous rehydration process will be one which would rehydrate the lumen areas of the individual fibers.

It is known that initial ion-stripping and replacement do not improve WRV restoration. Ion stripping and replacement improves energy requirements to restore WRV levels, but drainage loss is still 3–6 fold greater than desired. Also, enzyme hydrolyses of once-dried fiber improves WRV levels approximately 5%. Anti-oxident fiber pretreatment does not affect WRV levels of once-dried fibers.

Finally, it is well known to employ conventional chemical/thermal treatment to improve dispersion, but with little rehydration benefit. Increased pH and elevated temperatures during the mechanical treatment improves dispersion of once-dried fiber significantly, but rehydration is not greatly improved. In fact, digester treatment of once-dried fiber in an alkaline mixture (10-to-1 liquor-to-fiber ratio) at 145° C. produced a yield of 83%.

Exemplary of such prior art is U.S. Pat. No. 2,454,534 ('534) to H. E. Walter, entitled "Process For Defibering Lignocellulose While Subjected to Steam and Alkali-Metal Hydroxide". The process in the Walter patent describes defibering in the presence of a strong alkali. While the patent is described as being effective on lignocellulose, particularly wood chips, it does not mention hydration of once-dried cellulosic fiber, especially once-dried bleached (essentially lignin free) fiber. Also, the Walter patent employs the use of the strong alkali. Therefore, a further advantageous hydration process would be one which would hydrate the lumens of the fiber while avoiding the use of the strong alkali.

It is apparent from the above that there exists a need in the art for a rehydration method which is capable of rehydrating once-dried fiber lumens, but which at the same time avoids the use of conventional cooking liquors.

It is a purpose of this invention to fulfill these and other needs in the art in a manner more apparent to the skilled artisan once given the following disclosure.

SUMMARY OF THE INVENTION

Generally speaking, this invention fulfills these needs by providing a method for rehydrating and increasing the water retention value of once-dried fiber lumens, comprising the steps of: placing a fibrous furnish prepared from dry broke having once-dried fiber lumens within a digester means; combining a predetermined amount of water with the furnish within said digester means; elevating a temperature of the digester means; cooking the furnish/water mixture in the digester means at a predetermined cooking temperature for a predetermined time such that the once-dried fiber lumens become substantially rehydrated and a water retention value of said fiber lumens is increased; cleaning the rehydrated fiber lumens; and dewatering the rehydrated fiber lumens to a predetermined consistency.

In certain preferred embodiments, the predetermined ratio of water-to-furnish is 10-to-1. Also, the temperature is gradually elevated for 45 minutes to 145° C. The furnish/water mixture is cooked at 145° C. for 60 minutes. Finally, the rehydrated fiber lumens are dewatered to a consistency of about 20% solids.

In another further preferred embodiment, the rehydration of the once-dried fiber lumens makes these fibers act more like virgin (never-dried) fiber without significant increases in drainage resistance.

The preferred rehydration method, according to this invention, offers the following advantages: improved rehydration of once-dried fibers; improved slowness; improved ash content; increased water retention value; ease of operation; and good economy. In fact, in many of the preferred embodiments, these factors of improved rehydration, improved slowness, improved ash content, increased water retention value, and ease of operation are optimized to an extent that is considerably higher than heretofore achieved in prior, known rehydration methods.

The above and other features of the present invention, which will become more apparent as the description proceeds, are best understood by considering the following detailed description in conjunction with the single FIGURE drawing, and in which:

A BRIEF DESCRIPTION OF THE DRAWING

The FIGURE is a graphical illustration of water retention value in grams of water per grams of fiber versus Williams Slowness in seconds per 3 times grams, according to the present invention.

DETAILED DESCRIPTION OF THE INVENTION

In order to improve the quality of fibrous furnish prepared from dry broke utilized in the production of paperboard grades and to minimize a negative effect of high broke furnish levels on product formation and surface smoothness, samples of conventional deflaked and refined broke were processed in a conventional laboratory scale batch digester. The broke referred to in the present invention is dry broke which is made when paper is spoiled in going over the driers or through the calenders, trimmed off in the rewinding of rolls, trimmed from sheets being prepared for shipping or discarded from manufacturing defects. It is usually returned to a repulping unit for reprocessing.

Conventional cooking liquor, such as, NaOH/Na$_2$S and water were added (at liquid-to-broke ratios of greater than 5-to-1) evaluated at high temperature (130–150° C.) and conventional pressure to rehydrate the broke and increase the water retention value (WRV) and fiber flexibility. The samples were then conventionally washed and dewatered to a consistency of 10–30% solids.

As discussed earlier, once-drying reduces WRV of broke furnish to less than 75% of virgin fiber levels and increases individual fiber stiffness levels resulting in a broke furnish which is more difficult to rehydrate and with a greater flocculation propensity. Formation, surface smoothness, and fiber bonding are negatively impacted. The impact is particularly evident at high broke furnish percentages. The results of more particular testing of the broke furnish are discussed below in the example.

EXAMPLE

Broke Control

Broke furnish was collected after conventional deflaking and refining as taught by the prior art. A portion was retained for testing as broke control (slurry broke in FIGURE).

Broke Control-Dewatered

The remainder was dewatered using a conventional bag stand and cider press to in excess of 25% solids. A portion was retained for testing as the broke control-dewatered portion and the remainder was subjected to conventional laboratory scale digester trials.

Broke-Pulped-Water-Only

Two digester charges were conducted using water. One thousand (1000) o.d. grams of deflaked, refined and dewatered broke were cooked in each charge. The water-to-broke solids ratio was 10to-1. Total cook time was 105 minutes. The time to raise the batch digester to the cook temperature (145° C.) was 45 minutes and the time at cook temperature was 60 minutes. The digester was slowly vented to retain as many solids as possible. The contents were transferred to a conventional bag stand and conventionally washed. The pulp was conventionally dewatered to about 20% solids in a conventional cider press. The consistency was determined and the yield calculated. The average yield exceeded 99%.

Broke-Liquor Pulped

Two digester charges were conducted using conventional cooking liquor. The cooking liquor being NaOH/Na$_2$S. One thousand (1000) o.d. grams of deflaked, refined and dewatered broke were cooked in each charge. The liquor-to-broke solids ratio was 10-to-1. The total cook time was 105 minutes. The time to raise the digester to cook temperature (145°C.) was 45 minutes and the time at cook temperature was 60 minutes. The digester was slowly vented to retain as many solids as possible. The contents were transferred to a conventional bag stand and conventionally washed free of liquor. The pulp was conventionally dewatered to about 20% solids in a conventional cider press. The consistency was determined and the yield calculated. The average yield was in excess of 83%.

The white liquor NaOH/Na$_2$S) used had an effective alkali (E. A.) content of 86.51 gm/1, an active alkali (A. A.) content of 101.30 gm/1, alkali (T. A.) content of 123.04 gm/1, all as Na$_2$O. The sulfidity was measured at 29.2%.

The control and cooked samples were evaluated for beating time, water retention value (WRV), Williams Slowness and ash content. These are presented in TABLE 1, below.

TABLE 1

Effect of Digester Cooking

| Sample Identification | Beating Time (minutes) | Williams Slowness (sec/3 gm) | Ash Content (%) | Water Retention Value (gm H$_2$O/gm fiber) |
|---|---|---|---|---|
| Virgin HW/SW Blend 10/4/93 | | 20.0 | 0.22 | 1.438 |
| Virgin HW/SW Blend 6/93 | | 14.3 | 0.19 | 1.451 |
| Broke Control - | 0 | 37.0 | 4.41 | 1.111 |

TABLE 1-continued

Effect of Digester Cooking

| Sample Identification | Beating Time (minutes) | Williams Slowness (sec/3 gm) | Ash Content (%) | Water Retention Value (gm H₂O/gm fiber) |
|---|---|---|---|---|
| As Taken | 15 | 61.0 | | 1.285 |
| | 25 | 77.0 | | 1.369 |
| | 40 | 132.0 | | 1.522 |
| | 50 | 204.0 | | 1.530 |
| Broke Control - Dewatered | 0 | 27.0 | 3.09 | 1.043 |
| | 15 | 51.0 | | 1.124 |
| | 25 | 79.0 | | 1.368 |
| | 40 | 137.0 | | 1.550 |
| | 50 | 211.0 | | 1.646 |
| Broke - Liquor Pulped | 0 | 26.0 | 3.16 | 1.255 |
| | 15 | 40.0 | | 1.381 |
| | 25 | 56.0 | | 1.497 |
| | 40 | 93.0 | | 1.591 |
| | 50 | 134.0 | | 1.658 |
| Broke - Pulped - Water Only | 0 | 24.0 | 3.22 | 1.199 |
| | 15 | 42.0 | | 1.351 |
| | 25 | 63.0 | | 1.419 |
| | 40 | 108.0 | | 1.597 |
| | 50 | 162.0 | | 1.655 |

As can be seen in Table 1, the WRV of the broke produced, according to the present invention, improved by 12% with a resultant slowness loss. When broke slowness was increased to typical paper machine refined broke levels (40 seconds Williams Slowness) with conventional laboratory beating, WRV retention was 90% of virgin fiber WRV levels. Without treatment, refining to slowness levels of 75–150 seconds is required to reach virgin hardwood WRV levels.

It is to be understood that slowness and ash levels were reduced by dewatering and subsequent washing operations. Washing did not increase WRV levels even though ash levels were reduced. However, it has been determined that increased slowness will increase WRV values and that increased ash content will lower WRV levels.

TAPPI standard handsheets were prepared from the various broke discussed above with respect to Table 1 and the sample properties are set forth in Table 2, below. The WRV was increased due to cooking with water, according to the present invention. Slowness was decreased by cooking with water, according to the present invention.

TABLE 2

Handsheet Properties

| | SAMPLE PROPERTIES | | | |
|---|---|---|---|---|
| PROPERTY | BROKE- AS TAKEN | BROKE- DEWAT- ERED | LIQUOR COOKED BROKE | WATER COOKED BROKE |
| Water Retention Value- (gm H₂O/gm fiber) | 1.173 | 1.186 | 1.275 | 1.182 |
| Williams Slowness - (sec/3 gm) | 35.3 | 29.7 | 24.9 | 23.7 |

Finally, the FIGURE is a graphical illustration of water retention value versus Williams Slowness. As can be seen in the FIGURE, the broke, treated according to the present invention, had an improvement in WRV and slowness in comparison with the untreated broke. This is because the once-dried fiber which was treated, according to the present invention, behaves more like virgin fiber. While the values of the liquor-cooked broke are ideally closer to the virgin fiber values, the water-cooked broke values are very close to those of the liquor-cooked broke. Also, the water-cooked broke eliminates the use of the previously discussed, adverse cooking liquor. Clearly, Tables 1 and 2 and the FIGURE illustrate that the use of cooking liquor, compared to water only, lowered yield from 99% to 83%. Water alone is more cost efficient and negates the requirement of washing liquor from the resulting pulp.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for rehydrating and increasing the water retention value of individual once-dried fiber lumens, wherein said method consists of the steps of:

placing a fibrous furnish prepared from dry broke having individual once-dried fiber lumens within a digester means;

combining a predetermined amount of water with said broke furnish within said digester means wherein said predetermined amount of water and broke furnish is at a water-to-fiber solids ratio of greater than 5:1;

gradually elevating a temperature of said digester means to turn said water to steam;

cooking said broke furnish/steam mixture in said digester means at a predetermined cooking temperature for a predetermined time, such that said individual once-dried fiber lumens become substantially rehydrated and a water retention value of said individual fiber lumens is increased;

opening said rehydrated fiber lumens; and dewatering said rehydrated individual fiber lumens to a predetermined consistency of approximately less than 30% solids.

2. The method, as in claim 1, wherein said cooking temperature is approximately 130–150° C.

3. The method, as in claim 2, wherein said predetermined cooking temperature is approximately 145° C.

4. The method, as in claim 1, wherein said temperature elevating step is further comprised of the step of:

gradually elevating said temperature of said digester means for approximately 45 minutes.

5. The method, as in claim 1, wherein said predetermined time in said cooking step is approximately 60 minutes.

6. The method, as in claim 1, wherein said predetermined consistency is approximately 20% solids.

7. The method, as in claim 1, wherein said predetermined amount of water and broke furnish is at a water-to-fiber solids ratio of approximately 10:1.

* * * * *